US012689807B2

(12) United States Patent　　　　(10) Patent No.:　US 12,689,807 B2
Subramanian et al.　　　　　　　　(45) Date of Patent:　　　Jul. 21, 2026

(54) CHANNEL LINE UP PERSONALISATION

(71) Applicant: Amagi Corporation, Dover, DE (US)

(72) Inventors: Baskar Subramanian, Bangalore (IN); Siva Natarajan, La Cañada Flintridge, CA (US); Rajiv Kumar, Gurugram (IN); Sahil Malik, Gurugram (IN)

( * ) Notice: Subject to any disclaimer, the term of this patent is extended or adjusted under 35 U.S.C. 154(b) by 0 days.

(21) Appl. No.: 18/634,265

(22) Filed: Apr. 12, 2024

(65) Prior Publication Data

US 2024/0348888 A1　　Oct. 17, 2024

Related U.S. Application Data

(60) Provisional application No. 63/496,167, filed on Apr. 14, 2023.

(51) Int. Cl.
　H04N 21/482　　(2011.01)
　H04N 21/45　　(2011.01)
　H04N 21/466　　(2011.01)
　H04N 21/858　　(2011.01)

(52) U.S. Cl.
　CPC ..... H04N 21/4826 (2013.01); H04N 21/4532 (2013.01); H04N 21/4668 (2013.01); H04N 21/8586 (2013.01)

(58) Field of Classification Search
　CPC ........... H04N 21/4826; H04N 21/4532; H04N 21/4668; H04N 21/8586; H04N 21/252; H04N 21/25891; H04N 21/4821

USPC .......................................................... 725/46
See application file for complete search history.

(56)　　　References Cited

U.S. PATENT DOCUMENTS

| | | | |
|---|---|---|---|
| 10,306,327 B2 | 5/2019 | Cox | |
| 2003/0020744 A1* | 1/2003 | Ellis | H04N 21/4782 |
| | | | 348/E7.063 |
| 2003/0163463 A1* | 8/2003 | Cain | G06F 16/951 |
| 2004/0103120 A1* | 5/2004 | Fickle | G06Q 10/10 |
| 2006/0020973 A1 | 1/2006 | Hannum | |
| 2007/0156589 A1 | 7/2007 | Zimler | |
| 2010/0251304 A1* | 9/2010 | Donoghue | H04N 21/4755 |
| | | | 725/46 |
| 2011/0289422 A1* | 11/2011 | Spivack | G06F 16/951 |
| | | | 715/739 |
| 2012/0059825 A1* | 3/2012 | Fishman | G06F 16/4387 |
| | | | 707/737 |
| 2013/0205314 A1 | 8/2013 | Ramaswamy | |
| 2013/0332959 A1* | 12/2013 | Kothari | H04N 21/252 |
| | | | 725/39 |
| 2014/0089980 A1* | 3/2014 | Alexander | H04N 21/858 |
| | | | 725/42 |
| 2016/0112736 A1* | 4/2016 | Ellis | H04N 21/4147 |
| | | | 725/14 |
| 2020/0296467 A1* | 9/2020 | Bagga | H04N 21/4668 |

FOREIGN PATENT DOCUMENTS

KR　　20110040171 A　　4/2011

* cited by examiner

*Primary Examiner* — Cynthia M Fogg

(57)　　　ABSTRACT

A system and method to enable personalisation of channel line-up and channel information for linear channels on connected TV.

1 Claim, 5 Drawing Sheets

CHANNEL LINE UP PERSONALISATION

FIELD OF THE INVENTION

This invention describes a system and method to enable personalization of channel line-up and channel information for linear channels on connected TV.

BACKGROUND AND PRIOR ART

There has been an exponential increase in the number of linear TV channels available in the connected TV ecosystem. As the trend continues it is becoming increasingly difficult for viewers to discover channels they are interested in. It is impossible for the video platforms to curate so many channels without ruining the user experience.

It is leading to platforms selecting a fewer number of channels. Consequently the platform becomes a one size fits all product. Wherein all the viewers are shown the same set of channels. This curtails a large number of channels from getting distributed and discovered on the platform, which are required to keep customers happy and retain them.

The current system has: i) Limited number of channels manually selected by the platforms, and ii) Channels in the EPG are manually ordered such that all the viewers see the same order of channels.

U.S. Pat. No. 10,306,327B2 discloses 'Systems, apparatus, and methods for scalable low-latency viewing of integrated broadcast commentary and event video streams of live events, and synchronization of event information with viewed streams via multiple internet channels' where viewer device receives a copy of the integrated live event and commentator stream and synchronized event information (e.g., real-time scores), and displays the integrated stream and the event information.

KR20110040171A discloses 'Personalization broadcasting service system and personalization broadcasting service method' having a personal selection function for receiving/selecting any one of at least one personal item from a user is provided to the broadcasting network.

US20060020973A1 discloses a 'Method and system for presenting personalized television program recommendation to viewers' where the system provides viewer/user groups with an improved program recommendation feature for predicting programs that are likely to be of interest.

US20070156589A1 discloses 'Integrating personalized listings of media content into an electronic program guide' where recommended media selection is presented for display within the electronic program guide.

US20130205314A1 discloses 'Methods and apparatus to select media based on engagement levels' where methods and apparatus to select media based on engagement levels are disclosed.

The key problems with all the above approaches of EPG are that none of them drive personalization of EPG using viewership data. The above approaches require explicit inputs from the viewer for video on demand scenarios. Also the above approaches are focused on content level approach and not trying to personalize the linear channels. We are solving the problems by using user viewership behaviour to profile the user and then recommending one or more personalized orders of channels (Channel line-up) personalized set of channels and programs accordingly.

The system of the present invention is for channel line-up personalization (CLIP) of an Electronic Program Guide (EPG) for one or more viewers, using viewership data comprising (a) platform frontend which is used by one or more users to view the channel on various devices where the viewers see the list of available channels, make their selection and play the user's selection; (b) a platform backend which provides necessary inputs to be rendered by the platform frontend and collects viewership data; (c) a viewership data processor that consumes data from the Platform backend, processes the data to be consumed by one or more downstream sub-systems; (d) a CLIP backend which interacts with the Platform backend and downstream sub-systems, adapts the recommendations and provides it to Platform backend when required; € a CLIP Database (DB) that stores user level information and recommendations to be consumed by the Platform Backend; (f) one or more recommendation engines which consume viewer level viewership data and channel and content metadata to profile viewers and channels to provide personalized recommendations; (g) a recommendation adaptor; (h) an EPG service that stores and provides channel level program information to be consumed both by CLIP and Platform backend; (i) a playout service to create a linear viewing experience for the consumers; and (j) a metastore containing all the channel and content level information. In our system, the platform backend further showcases and streams linear channels using stream URLs which carry the video content to be delivered along with its program schedule for each channel that is the EPG information and the playout service in conjunction with the EPG provides the platform backend with video data and EPG data, respectively. Our system further has a CLIP notification endpoint updates CLIP DB when there is any addition or deletion of channels. The viewership data processor processes data that comes either from the server side or from the platform backend and further aggregates and transforms the same to be sent to different recommendation engines. One or more recommendation engines utilize pattern matching to provide personalized recommendations. The recommendation adaptor decides which recommendation engine can be used for a particular platform based on rules that are configured in the CLIP BE and augmented by a CLIP router. The CLIP Backend sits between the recommendation engine and the Platform backend wherein (a) it communicates to the recommendation engine which are the channels that are configured in the Platform and also rules that need to be honoured when a channel line-up recommendation is being created; and (b) it fetches the recommendations from the recommendation engine and delivers it to the platform BE. In our system the rules communicated include whether there are any channels whose positions are fixed due to business compulsions. The frontend further (a) uses the recommendations from the backend to render the channels in a particular order; and (b) uses imagery and textual information recommended by the system in a personalized manner.

Our invention further proposes a computer-implemented method for channel line-up personalization (CLIP) of an Electronic Program Guide (EPG) for one or more viewers, using viewership data having (a) a platform frontend, (b) a platform backend, (c) a CLIP backend, (d) a recommendation adaptor and (d) a recommendation engine, comprising the steps of:
   a. The platform frontend calling for the EPG;
   b. The platform frontend sharing viewership data;
   c. The platform backend returning the EPG with a personalized sequence;
   d. The platform backend sharing viewership data with the CLIP backend;
   e. The platform backend sharing channel data with the CLIP backend;

f. The platform backend pulling personalized EPG for every use from the CLIP backend;

g. The recommendation adaptor interfacing with the recommendation engine and passing the information to the recommendation engine;

h. The CLIP backend sharing viewership data with the recommendation engine;

i. The recommendation engine sharing cohort information for each user with the CLIP backend; and j. The recommendation engine sharing cohorts with the corresponding EPG line-up with the CLIP backend.

The method of our invention can work with one or more recommendation engines wherein there can be a mixture of third-party and inhouse recommendation engines.

In our method the platform backend further performs the steps of:

a. Collecting viewership data;

b. Bundling data for each user over a period of one or more days;

c. Sharing viewership data with a recommendation adaptor;

d. Checking to see if the user is an existing one;

i. If the user exists:

1. appending new data to the existing viewership data; and

2. Sending the data to the recommendation engine; and ii. If the user does not exist:

1. Creating a new user;

2. Starting the process of data collection for the new user; and

3. Sending data to the recommendation engine.

In the method of our invention, the platform backend further performs the steps of:

a. Sharing a list of channels, User IDs, User Ips, viewership data for each user;

b. Ingesting the data in step 'a' by a recommendation adaptor periodically;

c. The recommendation adaptor sharing the data with one or more recommendation engines;

d. One or more recommendation engines calculating the EPG sequence;

e. The recommendation adaptor getting the EPG sequence from one or more recommendation engines;

f. The recommendation adaptor sharing the EPG sequence with the platform backend wherein:

i. If the platform has featured channels:

1. The recommendation adaptor sharing the featured sequence of channels by the platform;

2. The recommendation adaptor augmenting the featured channels with a calculated sequence; and 3. The recommendation adaptor sharing the EPG sequence with the platform backend;

ii. If the platform does not have featured channels, the recommendation adaptor shares the EPG sequence with the platform backend.

Our invention further discloses a non-transitory, machine-readable storage medium having stored there on a computer program for channel line-up personalization (CLIP) of an Electronic Program Guide (EPG) for one or more viewers, using viewership data, the computer program comprising a set of instructions for causing a machine to perform the steps outlined in FIG. 4.

Our invention also discloses a scalable computer program product, the computer program product for channel line-up personalization (CLIP) of an Electronic Program Guide (EPG) for one or more viewers, using viewership data that adheres to the system and method disclosed above

4

DETAILED DESCRIPTION OF PREFERRED EMBODIMENTS

Figure 1:
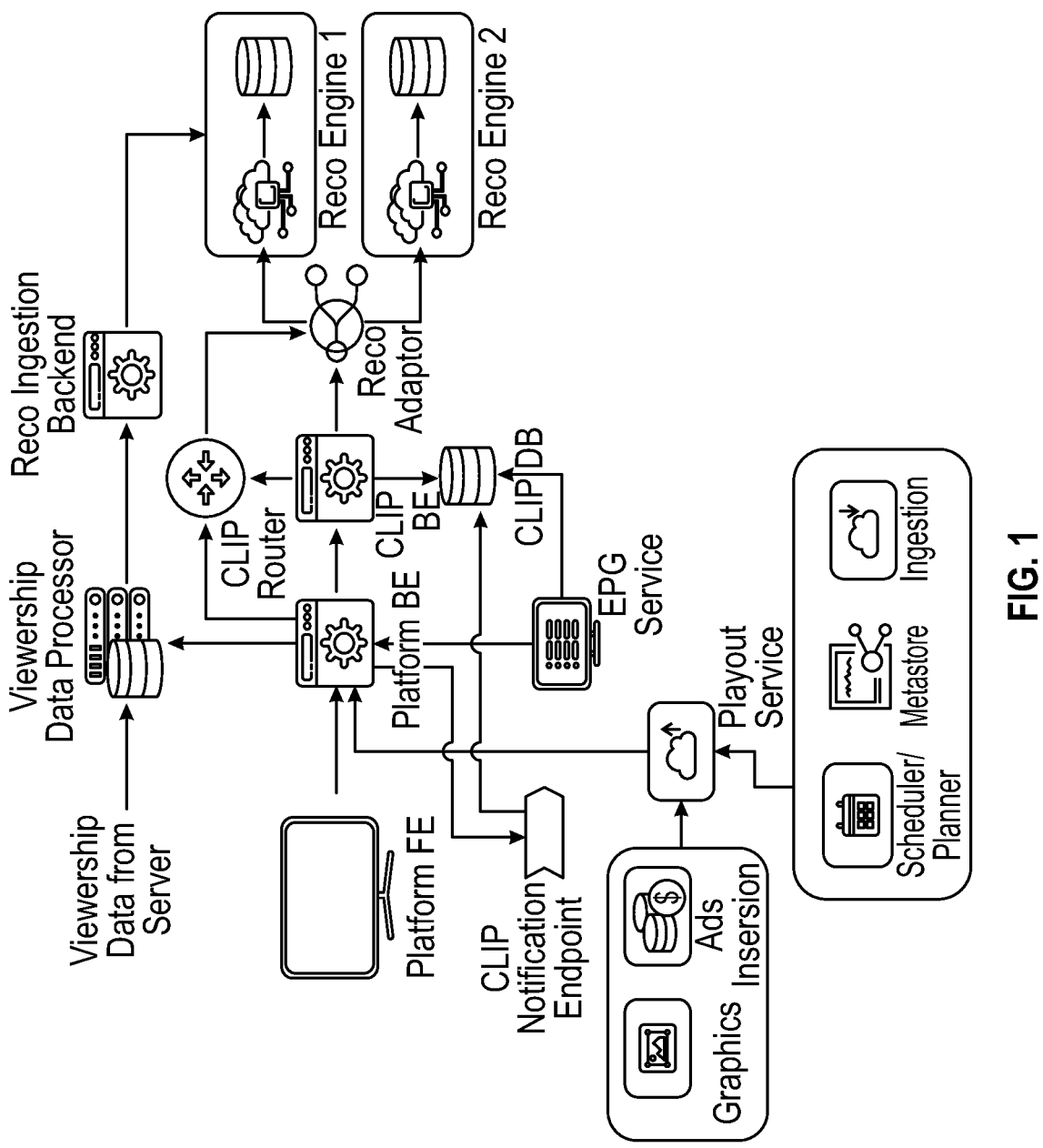
FIG. 1 describes the state of the art.

We disclose a system and method for personalization of the Electronic Program Guide (EPG) on connected TV. EPG personalization takes advantage of viewership data at a viewer level, combines it with viewer profiles and program metadata to provide viewer level custom EPGs to end viewers. EPG personalisation helps in better discovery of channels for each user based on their taste and consumption behaviour. Better discovery of relevant channels in the platform will lead to better retention of users in the platform and improve overall engagement time for each viewer.

Using viewership data and channel/program metadata the system can personalise EPG at various levels 1. Showing personalised line-up of channels for each user [order of channels and set of channels]

2. Showing personalised program thumbnails to each user

3. Creating a custom daily playlist for each user taking programs from various channels in the platform at different times of the day.

Our invention makes use of the following listed services

Platform Frontend: Platform frontend is the software application which is used by the user to view the channel on various devices such as Android TV, Smart phone, Web Browser, Fire TV devices etc. It is the application where the viewer sees all the list of available channels, selects and plays the channel the viewer likes.

Platform Backend: Platform backend is the backend system which interacts with the Platform Frontend thus providing necessary inputs to be rendered by the Platform frontend. It also collects viewership data like a viewer is watching which program on which channel for how much time etc. from the Platform Frontend.

Viewership data processor: Viewership data processor consumes data from the Platform backend, processes the data to be consumed by the downstream systems.

CLIP backend: Clip Backend is a system which interacts with the Platform backend and downstream systems, adapts the recommendations and provides it to Platform backend when required.

CLIP Database: Clip Database stores user level information and recommendations to be consumed by the Platform Backend, Recommendation Engine: Recommendation Engine consumes viewer level viewership data and channel/content metadata to profile viewers and channels to provide personalised recommendations. The recommendation engine will consume information such as: a viewer (male/female, age, household demographic etc.) is watching a History Crime channel (channel) and within that, the program they are watching is about World War II Crime (metadata)

EPG Service: EPG Service stores and provides channel level program information to be consumed both by CLIP and Platform backend.

Playout Service: A cloud playout system may be involved for the required content to create a linear viewing experience for the consumers.

Metastore—The Metastore is a library of all the content and channel level information.

Clip Notification endpoint listens to any updates propagated by the platform backend.

CLIP DB: CLIP database stores all the information about which channels are configured in the platform backend and also information about the users in the platform. CLIP notification endpoint updates CLIP DB when there is any addition or deletion of channels. CLIP notification monitors which channels were added or deleted on an ongoing basis in the system. For example, if a PETS channel gets removed from the EPG on January 31 (due to business or other reasons), CLIP notification will inform the CLIP DB that PETS channel should no longer be recommended for those viewers who were being recommended that channel till January 31. From February 1, that channel will be removed from the recommendation set for those viewers with the pet loving profile.

Viewership Data Processor: Viewership data may come either from the server side or from platform, both are consumed by the Viewership Data Processor, aggregated and transformed so that it can be sent to different recommendation engines. This processor consumes data from the Platform backend, processes the data to be consumed by the downstream systems. Viewership data processor receives the data from the platform backend and it converts/transforms the viewership data to be consumed by Recommendation Ingestion Backend, which will power the recommendation engines for better recommendations. This receives the viewership data from the Viewership data processor and powers the recommendation engines to produce better recommendations based on the viewership data received.

Recommendation Engine: Recommendation engines are components which use viewership data to understand viewing patterns and recommend appropriate content that the user is most likely to watch. There can be more than one recommendation engine which specialise in various kinds of pattern matching. Recommendation Engine consumes viewer level viewership data and channel/content metadata to profile viewers and channels to provide personalised recommendations.

A sample viewership data could look like:

```
{
  "Channel":
  "Platform":
  "programId":
  "DurationWatched":
  "contentType":
  "Title":
  "Description":
  "Language":
  "Genre":
  "Rating":
  "Actor":
  "Director":
  "Producer":
  "Writer":
  "ReleaseDate":
  "AirDate":
  "TotalDuration":
}
```

Recommendation Adaptor: Recommendation adaptor decides which recommendation engine can be used for a particular platform based on rules that are configured in the CLIP BE and augmented by the CLIP router. Each Platform will have their own recommendation engines for several reasons—for example, one for movie recommendation, one for TV show recommendation etc. For channel line-up personalization, depending on the configuration of which recommendation engine is to be used, the CLIP Router will pass that configuration parameter to the recommendation adaptor, so the data can be processed by that recommendation engine. Each Platform will have their own recommendation engines for several reasons—for example, one for movie recommendation, one for TV show recommendation etc. For channel line-up personalization, depending on the configuration of which recommendation engine is to be used, CLIP Router will pass that configuration parameter to the recommendation adaptor, so the data can be processed by that recommendation engine.

CLIP BE: CLIP Backend sits between the recommendation engine and the Platform backend. It communicates to the recommendation engine which are the channels that are configured in the Platform and also rules that need to be honoured when a channel line-up recommendation is being created. e.g., if there are any channels whose positions are fixed due to business compulsions. CLIP BE also fetches the recommendations from the recommendation engine and delivers it to the platform BE.

FIG. 1 illustrates an end to end system to acquire and deliver content for a Free Ad Supported Television from a content provider to a Platform so that it can be consumed by a viewer. There are various steps involved such as content ingestion, scheduling/planning of a channel, overlaying graphics, ads insertion, EPG creation/delivery, Playout etc. Ingestion is a process of acquiring, preparing, and incorporating video content into the platform's content library. All the processes eventually lead to the platform frontend rendering a viewer experience which includes an EPG that gives information to the viewer regarding which program will be streamed when and also information about the program itself via textual and graphical user interfaces. When a viewer clicks on to the EPG it results in a playback of the video stream on the platform side. In the current system the EPG section of the user interface is the same for every viewer irrespective of what the user is more likely to watch because there is no scope of personalisation. All the modules treat every viewer equally with no distinction. In FIG. 1, we have also added a system called CLIP or channel line-up personalisation to take in account user behaviour and provide custom experience to viewers accordingly. This system is separately described in detail in FIG. 3.

Figure 2:
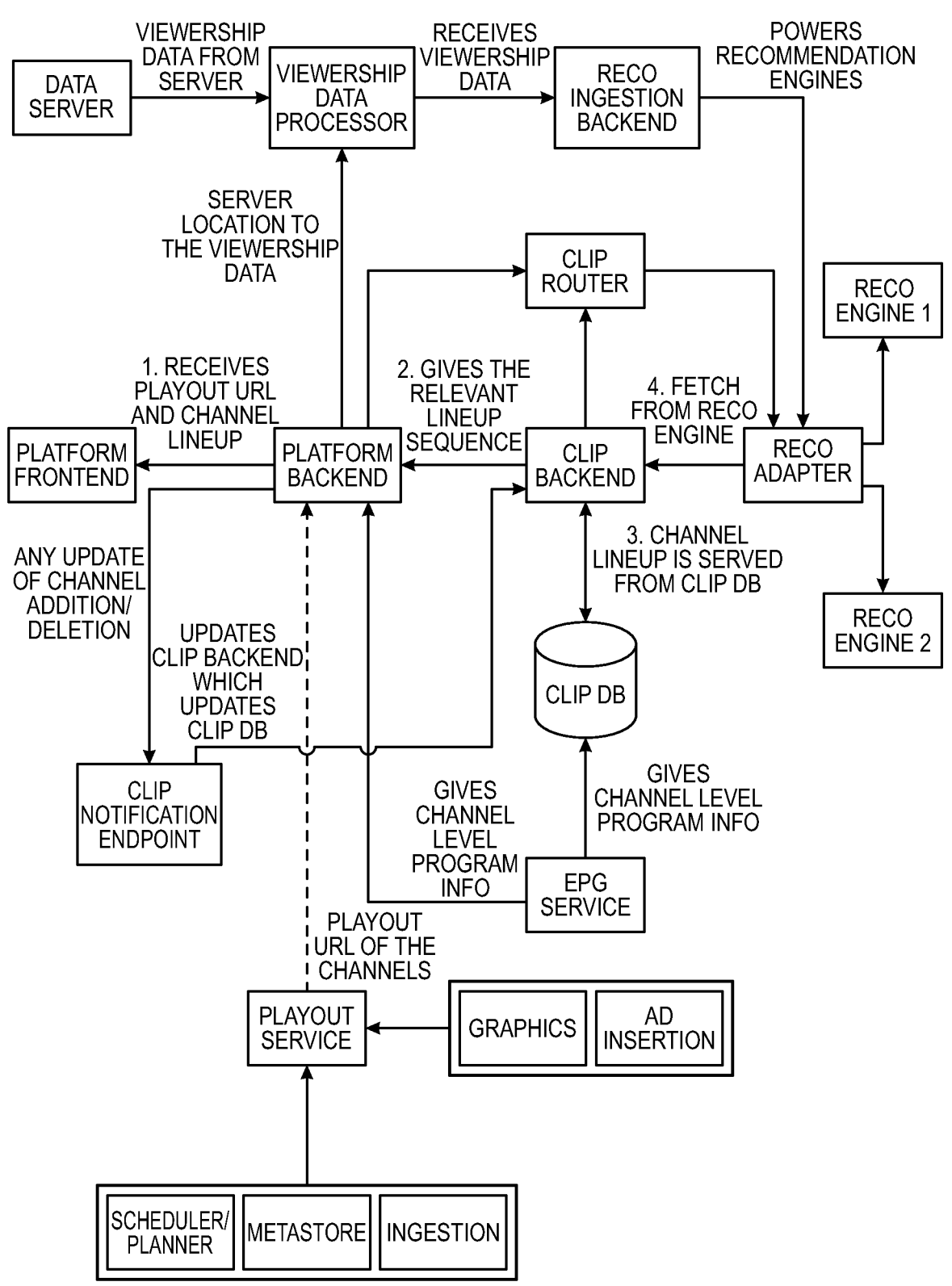
FIG. 2 describes the system of our invention.

FIG. 2 illustrates an end to end view of the system for channel line-up personalization (CLIP) of an Electronic Program Guide (EPG) for one or more viewers, using viewership data comprising a platform frontend, a platform backend, a viewership data processor, a CLIP backend, a CLIP Database (DB), one or more recommendation engines, a recommendation adaptor, an EPG service, a playout service and a metastore. The platform backend further showcases and streams linear channels using stream URLs which carry the video content to be delivered along with its program schedule for each channel that is the EPG information. The playout service in conjunction with the EPG provides the platform backend with video data and EPG data, respectively. A CLIP notification endpoint updates CLIP DB when there is any addition or deletion of channels. The viewership data processor processes data that comes either from the server side or from the platform backend and further aggregates and transforms the same to be sent to different recommendation engines. One or more recommendation engines utilize pattern matching to provide personalized recommendations. The recommendation adaptor decides which recommendation engine can be used for a particular platform based on rules that are configured in the CLIP BE and augmented by a CLIP router. Furthermore, the CLIP Backend sits between the recommendation engine and the Platform backend such that it communicates to the recommendation engine which are the channels that are configured in the Platform and also rules that need to be honoured when a channel line-up recommendation is being created and fetches the recommendations from the recommendation engine and delivers it to the platform BE. In this system one or more rules are communicated that include whether there are any channels whose positions are fixed due to business compulsions.

The frontend further uses the recommendations from the backend to render the channels in a particular order. Additionally, it uses imagery and textual information recommended by the system in a personalized manner.

Figure 3:
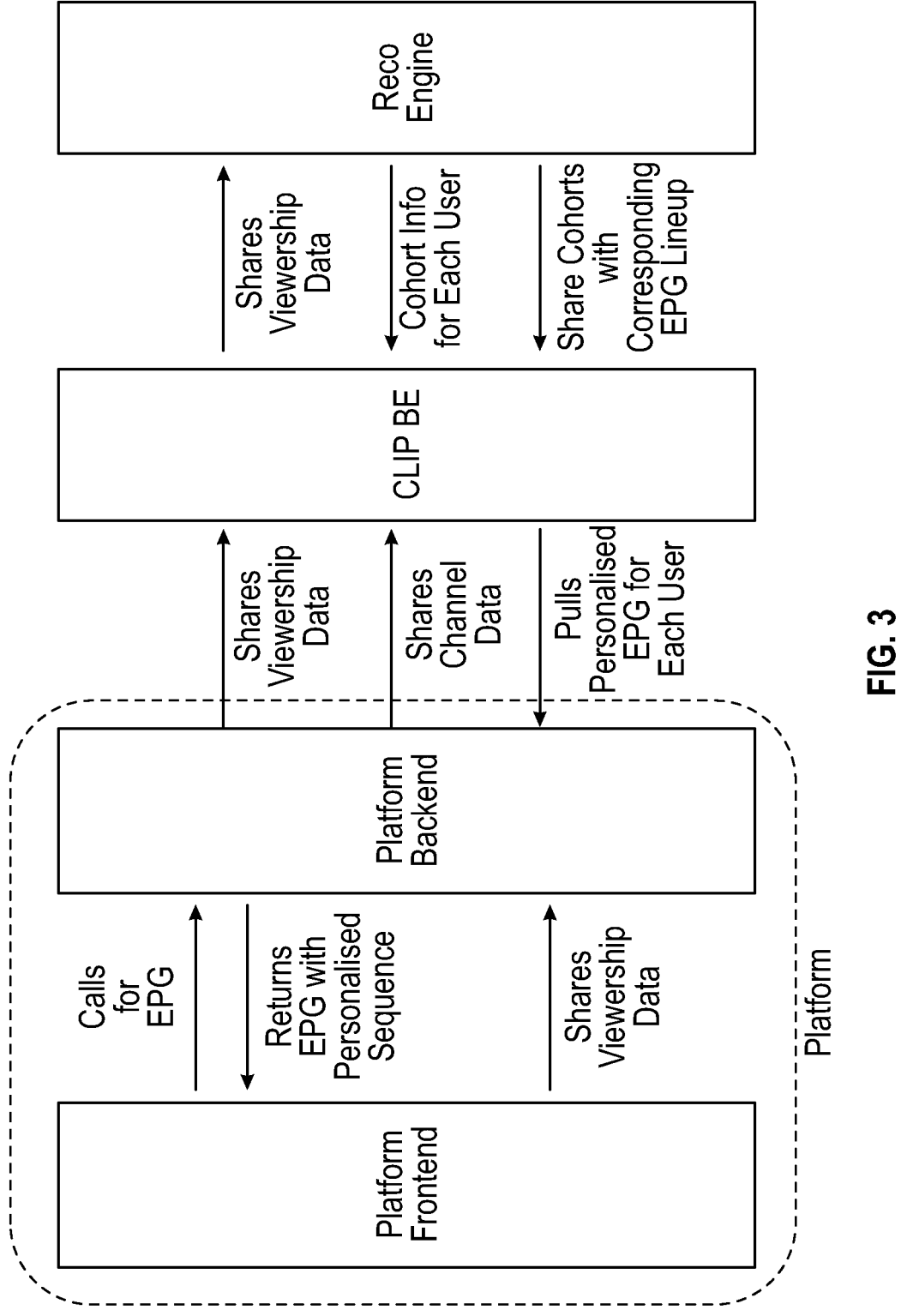
FIG. 3 shows a high level diagram of Channel line-up personalization system.

FIG. 3 shows a high level diagram of Channel line-up personalization system. While the platform frontend sits in the viewer's device like a CTV, smartphone etc. fetches information from the platform backend and renders the user interface for the viewer, it is also the component which collects viewership data and sends it back to the platform backend. The platform backend in turn gets information from CLIP BE and gives viewership data to CLIP BE. The recommendation engine sitting at the far end actually provides the recommendation on the basis of the viewership data that it gets from the CLIP BE and shares the recommendation with CLIP BE, from where it reaches Platform backend and then to Platform frontend.

Figure 4:
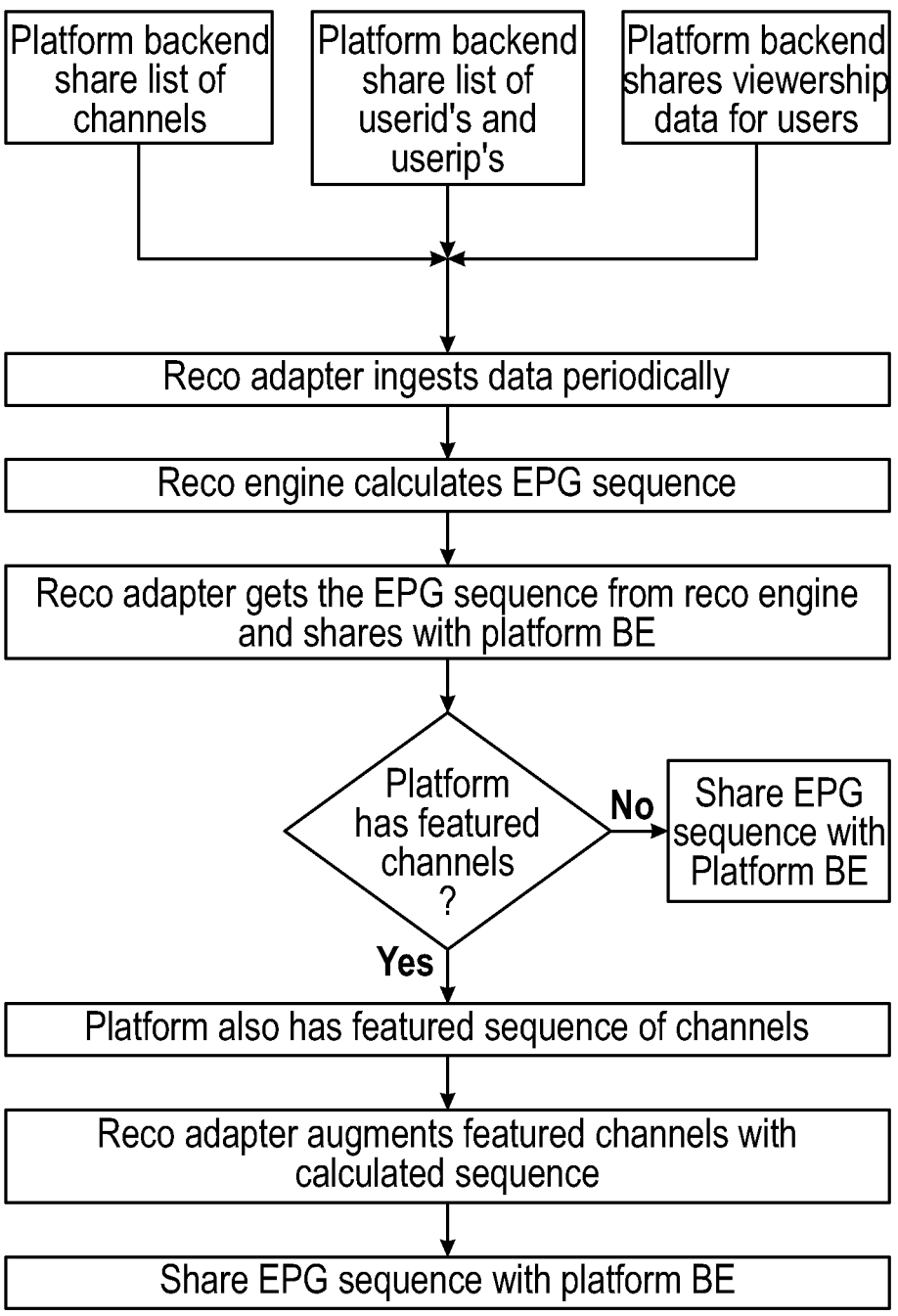
FIG. 4 describes the method of the invention.

FIG. 4 shows the overall method wherein the platform backend shares a list of channels in addition to user IDs and Ips and viewership data. The recommendation adaptor ingests data periodically. The recommendation engine calculates the EPG sequence and then gets the EPG sequence from the recommendation engine to share with the platform backend. There is then a check performed to see if the platform has featured channels. If not, the EPG sequence is shared with the platform backend. If there are featured channels the platform's featured sequence is accessed. The recommendation adaptor then augments the featured channels with the calculated sequence and shares the EPG sequence with the platform backend.

Figure 5:
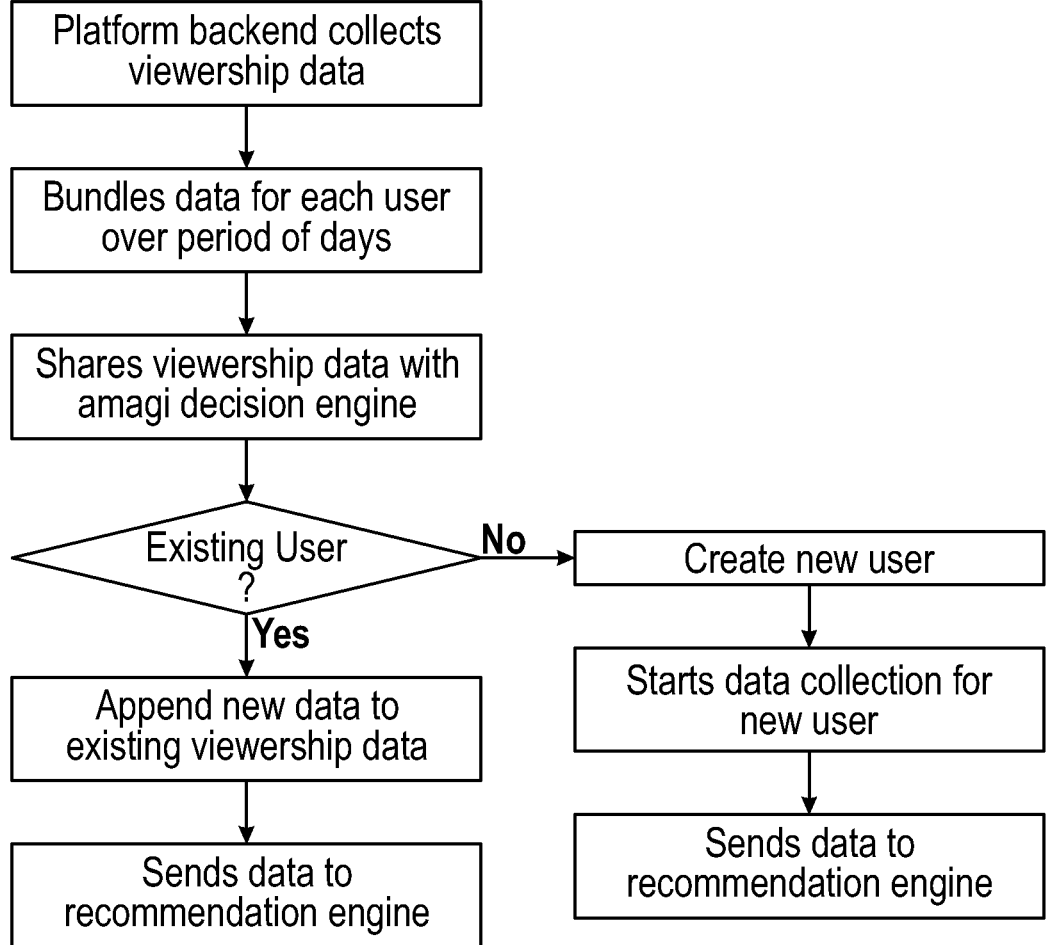
FIG. 5 shows how viewership data is collected

FIG. 5 illustrates how viewership data is collected. The platform backend collects viewership data. This data is bundled for each user over a number of days. This data is then shared with a recommendation adaptor. Then a check is performed to see if the user is an existing one. If not, a new user is created and the data for that new user is collected before sending the data to the recommendation engine. If the user is an existing one, the new data is appended to the existing user and then this is sent to the recommendation engine.

What is claimed is:

1. A system for generating personalized channel line-up sequences for a linear electronic program guide (EPG), comprising:

a platform backend configured to collect viewership data from a platform frontend and to request a personalized channel line-up for each user;

a CLIP database storing channel configuration data identifying channels currently available on the platform and storing cohort templates associating cohort identifiers with corresponding channel line-up sequences;

a CLIP notification endpoint configured to receive indications from the platform backend of channel additions or deletions and to update the channel configuration data in the CLIP database so that deleted channels are excluded from subsequent channel line-up sequences;

a plurality of heterogeneous recommendation engines each configured to generate channel-level viewing profiles from viewership data;

a CLIP router configured to select, based on platform-specific rules stored in the CLIP database, one of the heterogeneous recommendation engines to be used to generate a channel line-up sequence for a given platform;

a recommendation adaptor configured to transform aggregated viewership data received from the platform backend into a normalized format for the selected recommendation engine, to send the normalized viewership data and the channel configuration data to the selected recommendation engine, and to receive from the selected recommendation engine a cohort identifier for each user together with a channel line-up sequence associated with the cohort identifier;

and a CLIP backend configured to store the cohort identifier and the corresponding channel line-up sequence in the CLIP database, to enforce fixed-position channels specified in the channel configuration data by merging the fixed-position channels with the received channel line-up sequence, and to return to the platform backend, in response to each request, the merged personalized channel line-up sequence for the requesting user.

* * * * *